United States Patent
Kobayashi

[11] Patent Number: 6,125,431
[45] Date of Patent: Sep. 26, 2000

[54] SINGLE-CHIP MICROCOMPUTER USING ADJUSTABLE TIMING TO FETCH DATA FROM AN EXTERNAL MEMORY

[75] Inventor: Jiro Kobayashi, Tokyo, Japan

[73] Assignee: Oki Electric Industry Co., Ltd., Tokyo, Japan

[21] Appl. No.: 08/871,537

[22] Filed: Jun. 9, 1997

[30] Foreign Application Priority Data

Aug. 2, 1996 [JP] Japan ................................. 8-204410

[51] Int. Cl.[7] .................................................. G06F 12/00
[52] U.S. Cl. ................................ 711/154; 711/1; 712/32; 712/43
[58] Field of Search .......................... 395/568, 800.32, 395/842; 711/167, 2, 100, 154, 1; 712/32, 39, 43

[56] References Cited

U.S. PATENT DOCUMENTS

| | | | |
|---|---|---|---|
| 5,426,759 | 6/1995 | Padgaonkar | 711/1 |
| 5,511,176 | 4/1996 | Tsuha | 711/106 |
| 5,613,144 | 3/1997 | Hall et al. | 712/43 |
| 5,615,383 | 3/1997 | Caudel et al. | 712/43 |
| 5,623,686 | 4/1997 | Hall et al. | 712/32 |
| 5,860,016 | 1/1999 | Nookala et al. | 713/324 |
| 5,930,523 | 7/1999 | Kawasaki et al. | 712/32 |

FOREIGN PATENT DOCUMENTS

| | | |
|---|---|---|
| 60-45828 | 3/1985 | Japan. |
| 62-156737A | 7/1987 | Japan. |

*Primary Examiner*—John W. Cabeca
*Assistant Examiner*—Pierre-Michel Bataille
*Attorney, Agent, or Firm*—Venable; Robert J. Frank; Allen Wood

[57] ABSTRACT

It is an object of the present invention to provide a one-chip microcomputer which permits the access time for an external memory to be equal to that for an internal memory. The one-chip microcomputer 10 includes an internal ROM 11, control circuit 12, output terminals 13, input terminals 14, control circuit 15, selector 16, instruction register 17, delay circuit 18, and fetch control signal select gate 19. For selection of the external ROM 30, a control arrangement 20 and a delay circuit 18 are employed in one embodiment to adjust the time at which ROM data is fetched by the instruction register 17, based on the delay time for accessing the external ROM 30.

13 Claims, 3 Drawing Sheets

SINGLE-CHIP MICROCOMPUTER USING ADJUSTABLE TIMING TO FETCH DATA FROM AN EXTERNAL MEMORY

BACKGROUND OF THE INVENTION

1. Field of the Invention

The present invention relates to a one-chip microcomputer and more particularly to a one-chip microcomputer which can access an external memory.

2. Prior Art

In general, a one-chip microcomputer has a ROM within itself (hereinafter, referred to as an internal ROM) and operates according to a program contained in the ROM. The one-chip microcomputer may also have a ROM connected externally (hereinafter, referred to as an external ROM) and operate according to the instructions read out of the external ROM via the data input terminals of the one-chip microcomputer.

An example of a one-chip microcomputer of this type is disclosed in Japanese Unexamined Patent Publication No. 62-156737. The system disclosed in the patent publication is able to execute either a program stored in the internal ROM or a program stored in the external ROM. Then, it has a switching circuit which switches the operation between the internal ROM and the external ROM as well as an instruction register which, upon receiving an output from the switching circuit, holds an instruction necessary for operation of the one-chip microcomputer.

The switching circuit comprises the switching gates for selecting internal ROM data or external ROM data. Within the one-chip microcomputer are generated internal signals, which are followed by the internal ROM operation and the external ROM operation. In summary, pursuant to the internal signals, the internal ROM or the external ROM is selected, the control signal to control the external ROM operation is generated, and the timing signal to allow latching of an instruction in the instruction register is generated.

FIG. 3 is a timing chart to depict memory access of a one-chip microcomputer with the switching circuit to select one of the internal ROM and the external ROM. In FIG. 3, OSC denotes the output signal of an oscillator, ½OSC denotes a signal with half of the output signal frequency, ALE denotes an Address Latch Enable (ALE) signal, PSEN (low-active signal) denotes a strobe signal for the read operation. The top half (a) of the figure is the timing chart of the internal ROM, and the bottom half (b) is that of the external ROM. The operation shown in FIG. 3(a) and that shown in FIG. 3(b) are basically the same except that the ALE signal, PSEN signal, and address signal in FIG. 3(b) lag behind those in FIG. 3(a). This delay is caused by factors such as capacitance of the terminals and circuits lying in the vicinity thereof.

As shown in FIG. 3(b), when the external ROM is selected, the one-chip microcomputer specifies an address for the external ROM on the falling edge of the Address Latch Enable (ALE) signal. And, when the PSEN signal falls, an instruction is read from the data bus terminal of the external ROM. When the ROM data fetch signal rises, the instruction is fetched into a CPU.

As described above, the switching circuit in a conventional one-chip microcomputer simply selects the internal ROM or external ROM based on the internal signal. There is no measure to permit access of the external memory in an access time similar to that of the internal memory.

Therefore, when the internal ROM is selected, there is no problem with instruction fetching because of no delay in fetching an instruction into the instruction register. On the contrary, when the external ROM is selected, there may be a problem with instruction fetching because of a delay in fetching an instruction into the instruction register. In short, the timing in which an instruction is fetched from the external ROM lags behind the timing in which an instruction is fetched from the internal ROM. As a result, there is not enough time for instruction fetching of the external ROM in comparison with the internal ROM.

Such a condition requires an external ROM capable of operating faster to compensate for the delay in instruction fetching, thereby leading to increased cost.

SUMMARY OF THE INVENTION

It is an object of the present invention to provide a one-chip microcomputer which can access the external ROM in the same manner as the internal ROM. According to the present invention, the one-chip microcomputer to which the external storage is connectable adjusts a fetch control signal so that the timing when data is fetched from the external storage is closer to the timing when data is fetched from the internal storage.

BRIEF DESCRIPTION OF THE DRAWINGS

The present invention will be understood more fully from the detailed description and the accompanying drawings below of the preferred embodiments of the invention.

In the drawings.

DESCRIPTION OF THE PREFERRED EMBODIMENT(S)

First Embodiment

Figure 1:
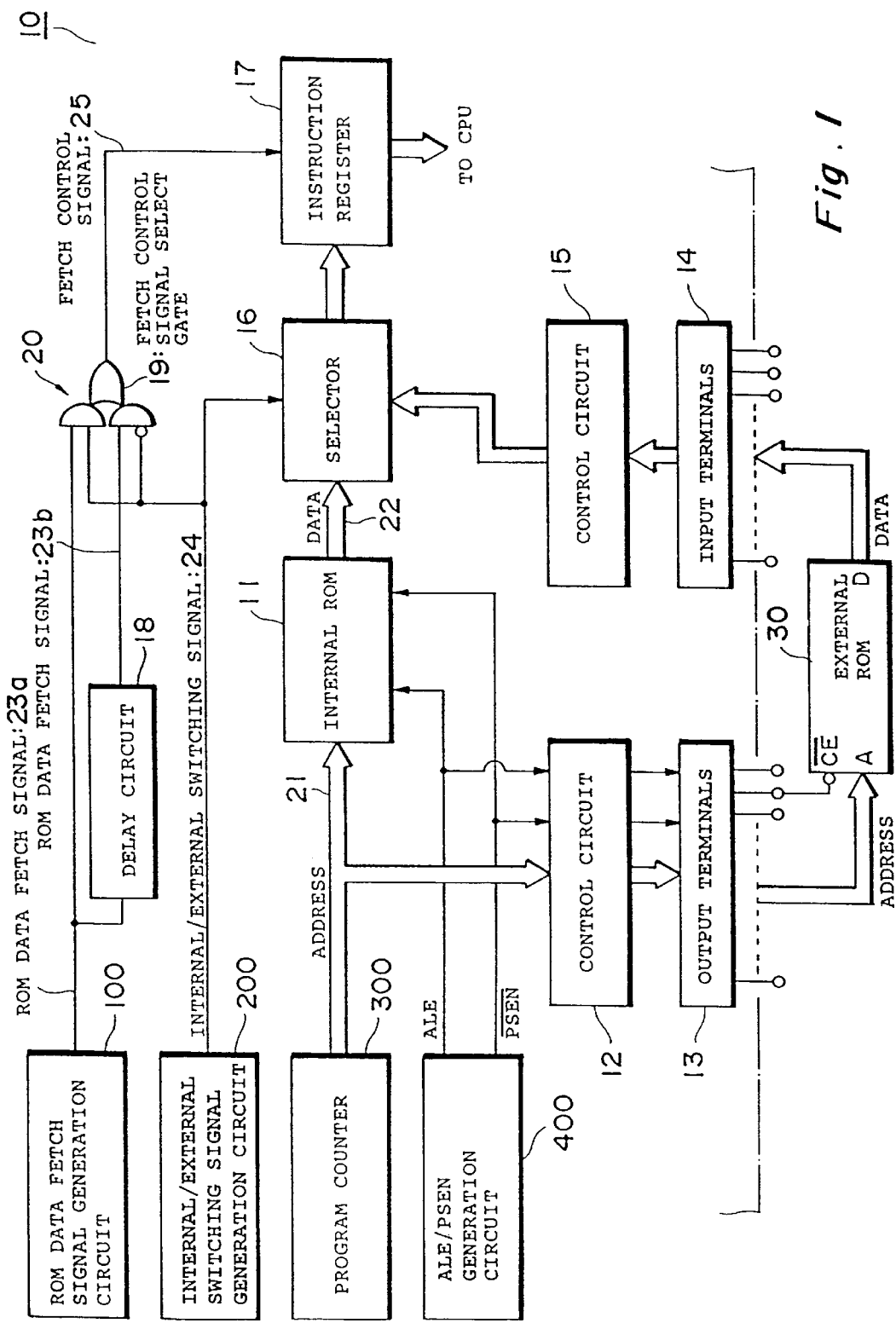
FIG. 1 is a block diagram showing the configuration of the one-chip microcomputer according to the first embodiment of the present invention.

FIG. 1 is a configuration diagram of the one-chip microcomputer according to the first embodiment of the present invention. In FIG. 1, the one-chip microcomputer 10 has a ROM data fetch signal generation circuit 100, internal/external switching signal generation circuit 200, program counter 300, ALE/PSEN generation circuit 400, internal ROM 11, control circuit 12, output terminals 13, input terminals 14, control circuit 15, selector 16, instruction register 17, delay circuit 18, and fetch control signal select gate 19. In addition, an external ROM 30 is disposed outside of the computer.

The ROM data fetch signal generation circuit 100 generates a ROM data fetch signal 23a which allows fetching by the instruction register 17. The internal/external switching signal generation circuit 200 generates an internal/external switching signal 24 which causes the selector 16 to select an instruction either from the internal ROM or from external ROM. The program counter 300 generates an address signal 21 which specifies an address in the internal ROM or external ROM. The ALE/PSEN generation circuit 400 generates the PSEN signal which strobes the ALE signal to latch the address signal and an instruction.

The internal ROM 11 outputs instruction data stored at an address specified by the program counter 300 using the address signal 21, and the instruction data are fed to the selector 16. The control circuit 12 controls the external ROM 30, receiving the address signal, address latch enable (ALE) signal, and the PSEN signal, controlling the signal output timing, and outputting the signals via the output terminals 13.

The external ROM 30 outputs data to the selector 16 via the input terminals 14 and control circuit 15. The external ROM 30 has address input terminals "A", data output terminals "D", and a "CE" (low active) input terminal to receive a chip enable (CE) signal. Applied to the CE input terminal, the PSEN signal allows the external ROM 30 to output data.

The selector 16 selects either data from the internal ROM 11 or data from the external ROM 30 according to the internal/external switching signal 24. For example, when the internal/external switching signal 24 is "1", the selector 16 selects data from the internal ROM 11; when the signal is "0", the selector 16 selects data from the external ROM 30.

The instruction register 17 latches data from the internal ROM 11 or data from the external ROM 30, whichever is selected by the selector 16, upon receiving the fetch control signal 25 from the fetch control signal select gate 19.

The delay circuit 18 and the fetch control signal select gate 19 constitute a control means 20, which adjusts the external ROM operation time to the internal ROM operation time. More specifically, the delay circuit 18 delays the ROM data fetch signal 23a a specified length of time; it generates a ROM data fetch signal 23b by delaying the ROM data fetch signal 23a by a length of time equal to the delay of the address signal, ALE signal, and PSEN signal which is caused by the control circuit 12 and output terminals 13. The delay may also be implemented by a delay circuit according to the delay time measured in advance.

The fetch control signal select gate 19, composed of AND gates and OR gates, selects one of two signals, either the ROM data fetch signal 23a or the signal 23b delayed by the delay circuit 18 for a specified length of time, according to the status of the internal/external switching signal 24. The fetch control signal select gate 19 then sends the instruction register 17a fetch control signal 25 allowing fetching.

Hereinafter, the operation of the one-chip microcomputer 10 will be described in detail. As for selection of the internal ROM 11, the internal/external switching signal 24 is set to "1", causing the selector 16 to select data from the internal ROM 11 for transmission to the instruction register 17. In this case, the fetch control signal select gate 19 selects the ROM data fetch signal 23a, which is sent to the instruction register 17 as the fetch control signal 25. Thus, data from the internal ROM 11 is sent to the CPU via the selector 16 and the instruction register 17.

Next, as for selection of the external ROM 30, the internal/external switching signal 24 is set to "0", causing the selector 16 to select data from the external ROM 30 for transmission to the instruction register 17. Additionally, the fetch control signal select gate 19 selects the ROM data fetch signal 23b generated by delaying the ROM data fetch signal 23a by a specified length of time; the ROM data fetch signal 23b which has been delayed by the specified length of time is sent to the instruction register 17 via the fetch control signal select gate 19.

As described above, the ROM data fetch signal 23b lags behind the ROM data fetch signal 23a by a specified length of time. This allows the instruction fetching into the instruction register 17 to be delayed by a specified length of time as compared with the instruction fetching from internal ROM 11.

As explained above, for selection of the external ROM 30, the one-chip microcomputer 10 according to the first embodiment adjusts the fetching time of the instruction register 17 using the ROM data fetch signal 23b output from the delay circuit 28. This enables the external ROM 30 to function in the same time cycle as that of the internal ROM 11.

In short, unlike a conventional one-chip microcomputer which selects data from the internal ROM and the external ROM without any adjustment of fetching timing, the one-chip microcomputer 10 according to this embodiment adjusts the operation timing of the internal ROM 11 and the external ROM 30. To adjust the timing, the one-chip microcomputer has the control means 20 and delay circuit 18 for adjusting the external ROM operation timing to the internal ROM operation timing. As a result, even though the external ROM 30 is selected, the one-chip microcomputer ensures an access time comparable to that for the internal ROM 11, thus avoiding the necessity of a sophisticated external ROM.

Note that, in the embodiment, only the delay caused by the control circuit 12 and the output terminals 13 is compensated. However, further delay caused by the input terminals 14 and the control circuit 15 may be also compensated in order to possibly allow the operation cycle of the external ROM 30 closer to that of the internal ROM 11.

Second Embodiment

Figure 2:
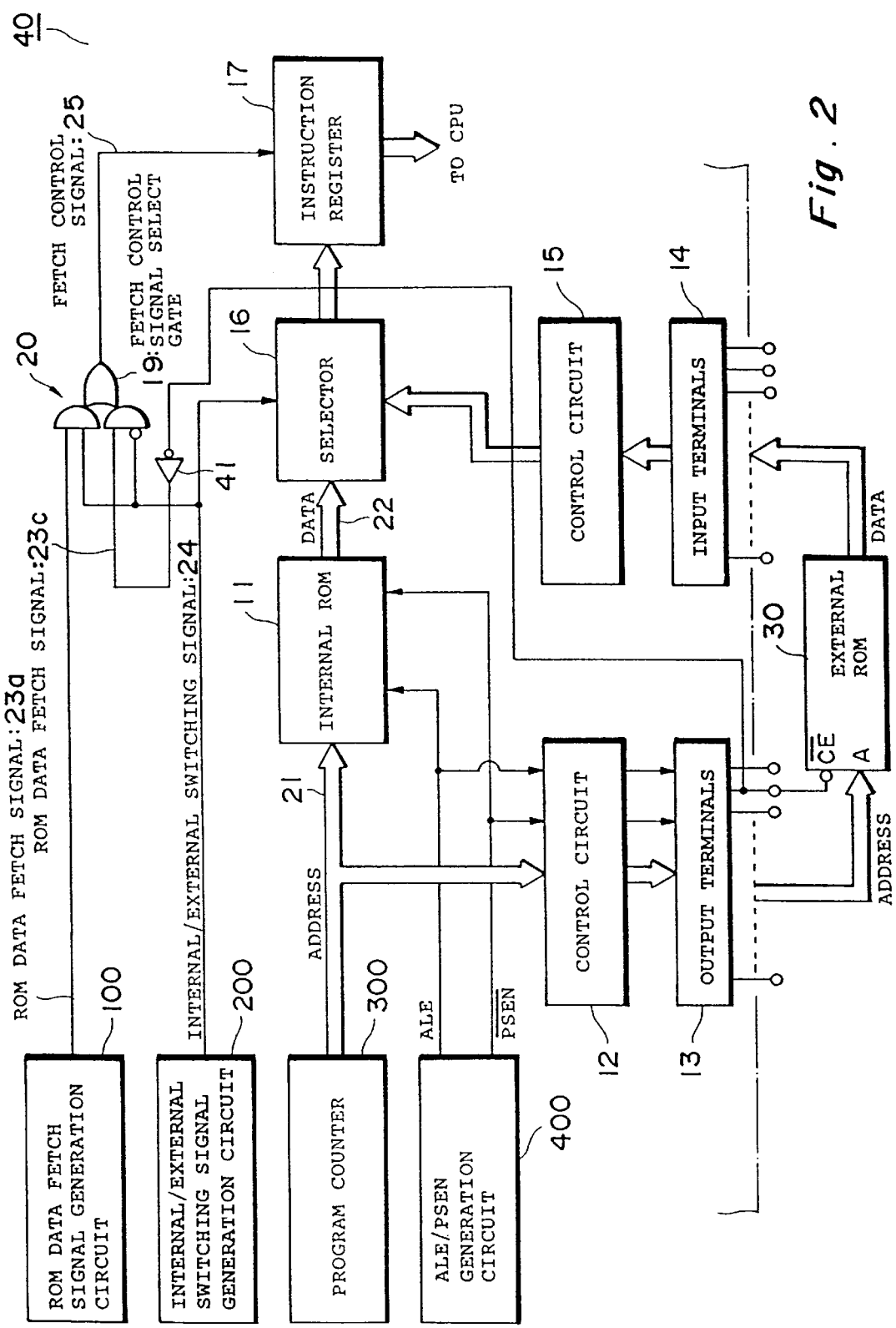
FIG. 2 is a block diagram showing the configuration of the one-chip microcomputer according to the second embodiment of the present invention.
Figure 3:
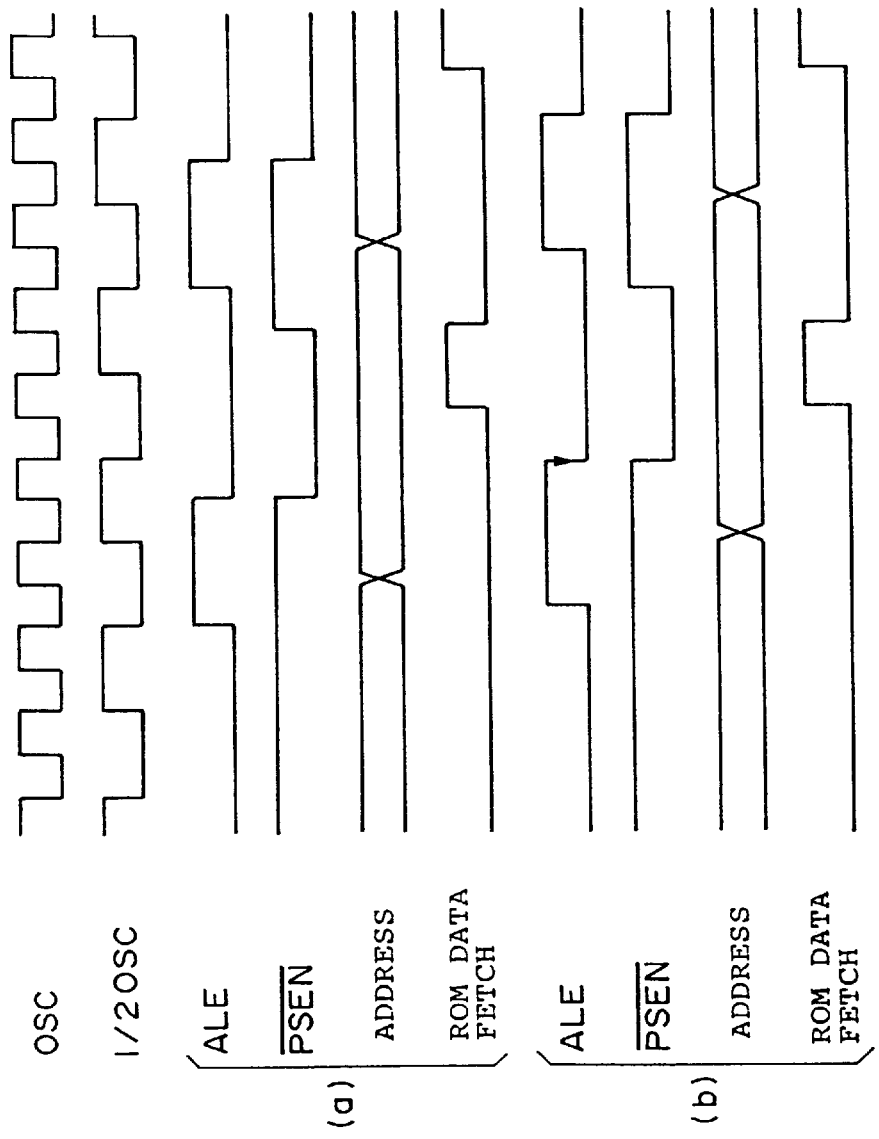
FIG. 3 is a timing chart showing the memory access timing of the one-chip microcomputer with a switching circuit switching the internal and external ROMs.

FIG. 2 is a block diagram showing the configuration of the one-chip microcomputer according to the second embodiment of the present invention. Note that the components in FIG. 2, which are shown also in FIG. 1 with corresponding numbers, will not be explained hereinafter.

The configuration of the one-chip microcomputer in the second embodiment is similar to that of the first embodiment except that an inverter 41 is added to accurately compensate for the delay caused in the control circuit 12 and the output terminal 13. The inverter 41 receives the PSEN signal at one of the output terminals 13 and outputs a ROM data fetch signal 23c to the fetch control signal select gate 19. The employment of the inverter 41 means that when the PSEN signal at the output terminal 13 is low, it is inverted and used as the fetch control signal 25 (ROM data fetch signal 23c).

In this embodiment, the PSEN signal is output from the ALE/PSEN generation circuit 400 and fed to the fetch control signal select gate 19 via the inverter 14. As for selection of the external ROM 30, the signal 23c applied to the fetch control signal select gate 19 is selected to be the fetch control signal 25 for the instruction register 17.

The operation of the one-chip microcomputer 40 with this configuration will be described below. Since the operation for selection of the internal ROM 11 is similar to that in the first embodiment, the following describes only the operation for the selection of the external ROM 30.

With selection of the external ROM 30, the internal/external switching signal 24 is set to "0" allowing the selector 16 to select data from the external ROM 30, whereby data from the input terminals 14 and via the control circuit 15 reach the instruction register 17. Besides, the fetch control signal select gate 19 selects the ROM data fetch signal 23c, which is applied to the instruction register 17. Accordingly, this permits the instruction fetching of the instruction register 17 to be delayed by a length of time equal to the delay caused through the control circuit 12 and the output terminal 13.

As described above, the one-chip microcomputer 40 according to the second embodiment employs the inverter 41 to adjust the ROM data fetch signal 23a by a length of time equal to the delay caused in the control circuit 12 and the output terminal 13, thus generating the ROM data fetch signal 23c. This eliminates the need for a delay circuit while still producing the same effect as that of the first embodiment. Note that, in this embodiment, only the delay caused by the control circuit 12 and the relevant output terminal 13 is adjusted. Another delay caused by the input terminals 14 and the control circuit 15 may be also compensated in order to possibly allow the control cycle of the external ROM 30 to be closer to that of the internal ROM 11.

What is claimed is:

1. A single-chip microcomputer having input terminals and output terminals, in combination with an external ROM having input terminals that are connected to the output terminals of the single-chip microcomputer and having output terminals that are connected to the input terminals of the single-chip microcomputer, wherein the external ROM stores instruction data; and wherein the single-chip microcomputer comprises:

an internal ROM which stores instruction data;

an internal/external switching signal generation circuit for generating an internal/external switching signal having a first digital level or a second digital level;

means for reading instruction data out of the internal and external ROMs;

a selector to select either instruction data that has been read out of the internal ROM or instruction data that has been read out of the external ROM according to the level of the internal/external switching signal;

an instruction register to receive the instruction data selected by the selector, the selected instruction data being fetched into the instruction register by a fetch control signal; and means for emitting the fetch control signal to the instruction register at a timing which depends on the level of the internal/external switching signal, the means for emitting comprising a data fetch signal generation circuit which generates a data fetch signal, means connected to one of the output terminals of the single-chip microcomputer for generating a further signal, and means responsive to the internal/external switching signal for passing either the data fetch signal or the further signal to the instruction register as the fetch control signal.

2. The combination of claim 1, wherein the means responsive to the internal/external switching signal comprises a plurality of gates.

3. A single-chip microcomputer which is selectively connectable to an external storage means for outputting data, said single-chip microcomputer comprising:

an output terminal, the output terminal being selectively connectable to the external storage means;

an internal storage means for outputting data;

an internal/external switching signal generation circuit for generating an internal/external switching signal having a first digital level or a second digital level;

a selector to select either data that has been output by the internal storage means or data that has been output by the external storage means according to the level of the internal/external switching signal; and means for emitting a fetch control signal for fetching the selected data from the selector at a timing which depends on the level of the internal/external switching signal, the means for emitting comprising a data fetch signal generation circuit which generates a data fetch signal, means connected to the output terminal for generating a further signal, and means responsive to the internal/external switching signal for selecting either the data fetch signal or the further signal for use as the fetch control signal.

4. The single-chip microcomputer of claim 3, wherein the means responsive to the internal/external switching signal comprises a plurality of gates.

5. A single-chip microcomputer which is selectively connectable to an external storage means for outputting data, said single-chip microcomputer comprising:

an output terminal, the output terminal being selectively connectable to the external storage means;

an internal storage means for outputting data;

an internal/external switching signal generation circuit for generating an internal/external switching signal having a first digital level or a second digital level;

a selector to select either data that has been output by the internal storage means or data that has been output by the external storage means according to the level of the internal/external switching signal;

an instruction register to receive the data selected by the selector, the selected data being latched into the instruction register by a fetch control signal;

means for emitting the fetch control signal to the instruction register at a timing which depends on the level of the internal/external signal, the means for emitting comprising a data fetch signal generation circuit which generates a data fetch signal, means connected to the output terminal for generating a further signal, and means responsive to the internal/external switching signal for passing either the data fetch signal or the further signal to the instruction register as the fetch control signal.

6. The single-chip microcomputer of claim 5, wherein the means responsive to the internal/external switching signal comprises a plurality of gates.

7. A single-chip microcomputer which is capable of executing first instructions and executing second instructions that are stored in an external storage unit that is connectable to the single-chip microcomputer, comprising:

an internal storage unit for storing the first instructions;

a program counter;

a first generation circuit for emitting a strobe signal;

first means for conveying the strobe signal and an address emitted by the program counter to the internal storage unit and to the external storage unit, the address and the strobe signal reaching the internal storage unit and then reaching the external storage unit after a delay;

an instruction register;

second means for selecting either a first instruction read out of the internal storage unit or a second instruction read out of the external storage unit in response to the address and the strobe signal, and for conveying the selected instruction to the instruction register;

a second generation circuit for emitting a fetch signal after the address and the strobe signal have been emitted; and third means for conveying the fetch signal to the instruction register so that the instruction register latches the selected instruction into the instruction register a first period of time after the fetch signal was emitted, if the selected instruction is a first instruction, and so that the instruction register latches the selected instruction into the instruction register a second period of time after the fetch signal was emitted, if the selected instruction is a second instruction, the second period of time being longer than the first period of time to compensate for the delay.

8. The single-chip microcomputer of claim 7, wherein the internal storage unit and the external storage unit are read only memories.

9. The single-chip microcomputer of claim 7, further comprising a first set of terminals and a second set of terminals, the external storage unit being connectable to the first and second sets of terminals.

10. The single-chip microcomputer of claim 9, wherein the first means comprises conductors connecting the program counter and the first generation circuit to the internal storage unit, and a memory control circuit connected between the conductors and the terminals of the first set.

11. The single-chip microcomputer of claim 10, wherein the second means comprises a control circuit, a third generation circuit for generating an internal/external switching signal, a selector that is connected to the third generation circuit to receive the internal/external switching signal, the selector having a first input port that receives the first instructions from the internal storage unit, a second input port that receives the second instructions from the external storage unit by way of the second set of terminals and the control circuit, and an outlet port that emits the selected instructions to the instruction register.

12. The single-chip microcomputer of claim 11, wherein the third means comprises a delay circuit that is connected to the second generation circuit to delay the fetch signal, and a control circuit having a plurality of gates, the gates receiving input signals which include the fetch signal, the delayed fetch signal, and the internal/external switching signal, the gates of the control circuit generating an output which is supplied to the instruction register.

13. The single-chip microcomputer of claim 11, wherein the external memory unit has a chip-enable terminal, one of the terminals of the first set being connectable to the chip-enable terminal to convey the strobe signal to the chip-enable terminal, and wherein the third means comprises a control circuit having a plurality of gates, the gates having inputs that receive the fetch signal, the internal/external switching signal, and the strobe signal, the input that receives the strobe signal being connected to said one of the terminals of the first set.

* * * * *